United States Patent Office 3,189,276
Patented June 15, 1965

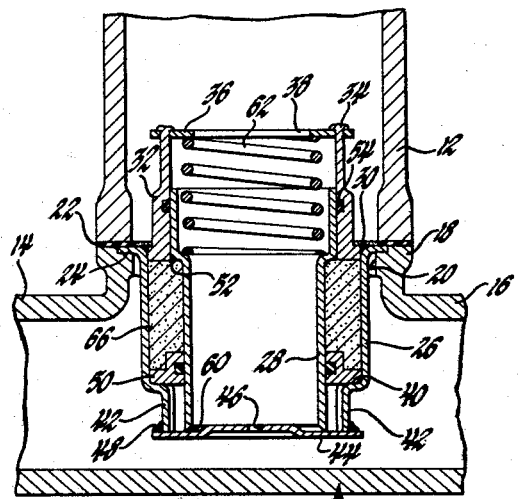

3,189,276
THERMOSTATIC VALVE FOR LIQUID COOLED ENGINE
Charles S. Bailey, Lockport, N.Y., assignor to General Motors Corporation, Detroit, Mich., a corporation of Delaware
Filed Jan. 22, 1963, Ser. No. 253,088
7 Claims. (Cl. 236—34)

This invention relates to thermostatic valves and more particularly to thermostats for controlling the temperatures of liquid cooled internal combustion engines.

Thermostats having valves operated to open by expansion of a temperature sensitive wax are conventional. Such a thermostat is diclosed in the United States Patent No. 2,815,916, granted December 10, 1957, in the names of J. R. Holmes, H. A. Reyonlds and A. Schwarz. The thermostat in the patent is of the butterfly valve type. A thermostat of the poppet valve type and also operated by an expansible wax is disclosed in the United States Patent No. 2,881,616, granted April 14, 1959, in the names of H. J. Clifford and A. Schwarz. Both types are adversely affected by pump pressures prevalent in engine cooling systems, but the poppet type is most seriously affected particularly at high engine speeds. Coolant pumps on modern production automotive engines sometimes develop pressures as high at 90 p.s.i. gage under wide open throttle conditions. High pump pressure tends to close and hold closed thermostatic valves thereby reducing or stopping coolants flow through the radiators. Another situation may develop in using these thermostats. If wax should leak out from a so-called pellet motor of a conventional thermostat, the valve of the latter will close and considerable damage may result because of the lack of coolant flow.

An object of the present invention is to provide an improved thermostatic valve which will "fail safe"—that is—become open for full coolant flow in the event the thermostat fails to operate properly. Another object is to provide an improved thermostatic valve the operation of which is unaffected by pump pressure.

To these ends, a feature of the present invention is a thermostat including a sleeve valve surrounded by temperature sensitive actuating means. Another feature is a thermostat comprising a valve seat detachable at elevated temperature by spring means to open the thermostat as a "fail safe" measure.

These and other important features of the invention will now be described in detail in the specification and then pointed out more particularly in the appended claims.

In the drawings:

FIGURE 1 is a sectional view of a closed thermostatic valve embodying the features of the present invention and as installed in a conduit junction of an engine cooling system;

FIGURE 2 is a view similar to that of FIGURE 1 but with the thermostatic valve open;

FIGURE 3 is a sectional view of modified thermostatic valve to which a hose may be connected and illustrating a "fail safe" provision by dotted lines; and FIGURE 4 is a sectional view looking in the direction of the arrows 4—4.

In FIGURE 1, a portion of a cooling system for an automobile engine is depicted as comprising the junction of two conduits 10 and 12. The conduit 10 has opposing ends 14 and 16 adapted to receive engine coolant from two banks (not shown) of a conventional V-8 engine. The conduit 10 has an upstanding rim 18 defining an opening 20 and between the rim 18 and the open end of the conduit 12 are clamped a sealing washer 22 and an annular flange 24 of a thermostat frame. The latter constitutes two telescopically arranged sleeves 26 and 28. The outer sleeve 26 is integral with the flange 24 and also permantently joined by welding as at 30 to an upstanding cylinder 32. The upper end of the cylinder 32 has portions 34 passing through an annular disk 36. The portions 34 are upset tightly to hold the cylinder 32 and disk 36 together. An opening 38 in the disk 36 is adequate to take a full flow of coolant to tbe controlled by the thermostat. The lower end of the sleeve 26 has an inwardly directed shoulder 40 and depending legs 42 traversing openings leading into the box-like structure of the thermostat formed by the outer sleeve 26 and an end plate 44. The end plate 44 having a central aperture 46 is joined to the ends of the legs 42 by means of solder 48 thereby forming an enclosure for the sleeve 28. An O-ring supporting member 50 is tightly held on the shoulder 40 and the O-ring forms a seal with the inner wall of the inner sleeve 28. The latter bears an outer shoulder 52 facing the inner shoulder 40 of the outer sleeve 26. An O-ring at 54 is used to form a seal between the upper end of the sleeve 28 and the cylinder 32. The lower end of the inner sleeve 28 is beveled as at 60 to seat on the end plate 44 when urged to do so by a coil spring 62 retained under load between the annnular disk 36 and the inner sleeve.

Assuming that the engine coolant is cold, the inner sleeve 28 will be positioned as shown in FIGURE 1 thereby closing off circulation of coolant from the conduits 14 and 16 into the inner sleeve 28. When the coolant becomes heated, however, an expansible thermosensitive wax 66 confined between the two sleeves will act against the shoulder 52 and push the inner sleeve 28 upwardly against the loading of the spring 62. As a consequence, coolant will flow between the end plate 44 and the bevel edge 60 and pass axially through the sleeve 28 and up through the opening 38 of the disk 36 and then to the engine by way of the conduit 12. The open position of the thermostat is clearly shown in FIGURE 2 and arrows indicate the flow direction. It will be noted that regardless of the position of the sleeve 28, radial forces exerted by the pump pressure in the system or the sleeve will have no effect in the opening or closing of the valve. It should also be noted that in the event the temperature of the coolant unduly arises, the solder 48 will melt and the plate 44 will fall away giving full flow. Also, if the engine is cold and there is leakage of the wax composition 66, the spring 62 will force the plate 44 away as soon as overheating occurs to an extent to melt the solder.

In the modification shown in FIGURES 3 and 4, an inner sleeve 70 is depicted as having a rounded edge at its bottom end and which is adapted to seat on an end plate 72 when urged to do so by a coil spring 74. In this case, however, an outer sleeve 76 is fluted as at 78 so that ribs 80 are adapted to guide the inner sleeve 70 in its required path of sliding motion. A wax composition 82 is retained between opposing shoulders 84 and 86 of the inner sleeve 70 and a fixed sealing ring 88 respectively. An O-ring 90 is held in a recess of the sleeve 76 to form a seal between the inner sleeve 70 and the outer sleeve 76. An upstanding portion 92 of the outer sleeve 76 is formed with an annular ridge 94 tightly to retain one end of a hose 96 as by means of a clamp 98. Conveniently, the outer sleeve 76, the upstanding portion 92 and an encircling flange 100 are made integral and in the form of a casting with the flange 100 apertured as at 102 for attachment to an engine block or to a rim 18 as shown in FIGURE 1.

The thermostatic valve of FIGURES 3 and 4 operate in the same manner as that of FIGURES 1 and 2, the only important difference being that the frame of the thermostat in FIGURES 3 and 4 permits convenient joinder of the hose 96. A simplicity of construction also results from this preferred construction as the upstanding portion 92 may be made with inturned flange as at 104 acting in combination with a washer 106 for the retention of the loaded spring 74.

I claim:

1. A thermostatic valve for controlling the flow of fluid in a conduit comprising a supporting frame adapted to be mounted in said conduit, and two telescopically arranged sleeves, the outer of said sleeves being fixed to said frame and having an inside shoulder, an end plate joined to said outer sleeve to form a box-like structure, the inner of said sleeves having an outside shoulder facing said inside shoulder and being slidable in said outer sleeve, spring means urging said inner sleeve toward said end plate to seat thereon, an opening in said box-like structure located outside the diameter of said inner sleeve and giving access to said inner sleeve, and an expansible temperature sensitive material filling the space between said shoulders.

2. A thermostatic valve comprising two telescopically arranged and relatively slidable sleeves carrying opposing shoulders, and expansible thermosensitive wax composition confined between said shoulders, an end plate fixed to one end of the outer of said sleeves to form an enclosure for the inner of said sleeves, spring means urging the inner of said sleeves toward said end plate, and an opening in said thermostat adjacent said one end and outside the diameter of said inner sleeves thereby giving access to the latter.

3. A thermostatic valve comprising two telescopically arranged and relatively slidable sleeves carrying opposing shoulders, and expansible thermosensitive wax composition confined between said sleeves in radial directions and between said shoulders along the length of said sleeves, an end plate fixed to one end of the outer of said sleeves by fusible material and having a marginal area extending outwardly beyond the diameter of the inner of said sleeves, said outer sleeve and end plate forming a unitary supporting structure, spring means urging the inner of said sleeves in a path of movement toward said end plate, and an opening in said unitary supporting structure adjacent to the junction of said outer sleeve and end plate and located outside the said path of movement.

4. A thermostatic valve comprising two telescopically arranged and relatively slidable sleeves carrying opposing shoulders, an expansible thermosensitive wax composition confined between said shoulders, the outer of said sleeves carrying a supporting flange intermediate its length, an end plate fixed to one end of the outer of said sleeves to form a supporting structure and a seat for the inner of said sleeves, spring means urging the inner of said sleeves toward said seat, and an opening in said supporting structure adjacent said one end and outside the diameter of said inner sleeve giving access to said seat.

5. A thermostatic valve comprising two telescopically arranged sleeves carrying opposing shoulders, one of said sleeves being slidable in the other, an expansible composition confined between said opposing shoulders, an end plate fixed to one end of the outer of said sleeves to form an inlet structure, the other end of said outer sleeve being adapted to receive a hose, spring means urging the inner of said sleeves toward said end plate, and an opening in said inlet structure adjacent said one end and outside the diameter of said inner sleeve to form a part of a passage leading to one end of said inner sleeve.

6. A thermostatic valve as set forth in claim 5, said end plate being fixed to said outer sleeve by a fusible material.

7. A thermostatic valve as set forth in claim 5, a supporting flange surrounding the outer sleeve and being located intermediate the length thereof, and said outer sleeve and flange being an integral casting.

References Cited by the Examiner

UNITED STATES PATENTS 2,941,404    6/60    Woods _____ 73—368.3

EDWARD J. MICHAEL, *Primary Examiner.*